US012719516B2

(12) United States Patent
Jung et al.

(10) Patent No.: US 12,719,516 B2
(45) Date of Patent: Aug. 25, 2026

(54) APPARATUS AND METHOD FOR CONTROLLING POWER AMPLIFIER IN LOW-ORBIT SATELLITE NETWORK

(71) Applicant: ELECTRONICS AND TELECOMMUNICATIONS RESEARCH INSTITUTE, Daejeon (KR)

(72) Inventors: Soo Yeob Jung, Sejong-si (KR); Jun Se Lee, Seoul (KR); Mi Kyung Oh, Daejeon (KR); Sang Jae Lee, Daejeon (KR); Joon Gyu Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 30 days.

(21) Appl. No.: 18/822,872

(22) Filed: Sep. 3, 2024

(65) Prior Publication Data

US 2025/0080146 A1 Mar. 6, 2025

(30) Foreign Application Priority Data

Sep. 4, 2023 (KR) ........................ 10-2023-0116993

(51) Int. Cl.

*H04B 1/04* (2006.01)
*H04B 7/185* (2006.01)
*H04B 7/195* (2006.01)

(52) U.S. Cl.

CPC ....... *H04B 1/0475* (2013.01); *H04B 7/18513* (2013.01); *H04B 7/18515* (2013.01);

(Continued)

(58) Field of Classification Search

CPC .... H03F 2200/451; H03F 3/245; H03F 3/195; H03F 3/19; H03F 3/24; H03F 3/211; H03F 3/21; H03F 1/56; H03F 1/0227; H03F 2200/102; H03F 3/72; H03F 2200/387; H03F 1/565; H03F 1/32; H04B 1/40; H04B 1/04; H04B 2001/0408; H04B 1/0475; H04B 1/0458; H04B 2001/0416; H04B 1/006; H04B 1/44; H04B 1/48; H04B 2001/045; H04B 1/18; H04B 1/0057; H04B 1/401; H04W 52/52; H04W 88/02;

(Continued)

(56) References Cited

U.S. PATENT DOCUMENTS 5,787,336 A 7/1998 Hirschfield et al.
7,113,032 B2 * 9/2006 Botti .................... H03F 1/0277 330/146

(Continued)

FOREIGN PATENT DOCUMENTS

KR 1020070116205 A 12/2007
KR 1020080048623 6/2008

(Continued)

*Primary Examiner* — Eva Y Puente
(74) *Attorney, Agent, or Firm* — Rabin & Berdo, P.C.

(57) ABSTRACT

According to an aspect of the present disclosure, there is provided a method of controlling a power amplifier in a low-orbit satellite network, the method comprising: communicating, by a terminal, with a satellite; setting an initial applied voltage and frequency; receiving orbit information from the satellite; and updating the initial applied voltage according to the orbit information and network environment.

18 Claims, 8 Drawing Sheets

(52) U.S. Cl.
CPC ..... *H04B 7/195* (2013.01); *H04B 2001/0416* (2013.01); *H04B 2001/0425* (2013.01)

(58) Field of Classification Search
CPC ....... H04W 12/06; H04W 88/06; H04W 4/80; H04W 72/02; H04W 52/367; H04W 24/08; H04W 4/44; H04W 72/0453; H04W 4/40; H04W 84/12; H04W 88/08; H04W 28/08
See application file for complete search history.

(56) References Cited

U.S. PATENT DOCUMENTS 8,095,090 B2 * 1/2012 Drogi .................. H03G 3/3042 455/127.1
8,260,226 B1 * 9/2012 Lipshitz .................. H04B 1/04 455/127.2
8,913,692 B1 12/2014 Copeland
10,033,568 B2 * 7/2018 Piazza ...................... H03F 3/24
10,560,562 B1 * 2/2020 Tandon ................. H01Q 21/28
11,171,613 B1 * 11/2021 Krishnaswamy ....... H03F 3/245
11,881,928 B2 * 1/2024 Gineste ............. H04B 7/18547
12,047,965 B1 * 7/2024 Talakoub ............ H04W 72/566
2007/0290748 A1 12/2007 Woo et al.
2009/0174475 A1 * 7/2009 Yuen .................... H03F 1/0216 330/133
2017/0310283 A1 * 10/2017 Cascone ................ H03F 1/301
2020/0212862 A1 * 7/2020 Hulsteijn ............ H04B 1/0458
2020/0371200 A1 * 11/2020 Kim ....................... G01S 7/354
2022/0052651 A1 * 2/2022 Khlat .................... H03F 1/3258
2022/0360223 A1 * 11/2022 Kultran .................... H03F 3/68
2023/0137974 A1 5/2023 Jung et al.
2024/0106467 A1 * 3/2024 Keskin ................... H03F 3/245

FOREIGN PATENT DOCUMENTS

KR 10-2011-0057029 A 5/2011
KR 10-1151142 B1 6/2012
KR 10-2023-0048079 A 4/2023

* cited by examiner

APPARATUS AND METHOD FOR CONTROLLING POWER AMPLIFIER IN LOW-ORBIT SATELLITE NETWORK

CROSS-REFERENCE TO RELATED APPLICATION

The present application claims priority to Patent Application No. 10-2023-0116993, filed on in Korea Intellectual Property Office on Sep. 4, 2023, the entire contents of which are incorporated herein by reference.

TECHNICAL FIELD

The present disclosure relates to an apparatus and method for controlling a power amplifier in a low-orbit satellite network.

BACKGROUND

The content described below merely provides background information related to one embodiment of the present disclosure and does not constitute prior art.

Low-orbit satellite networks have high benefits in terms of coverage compared to terrestrial networks, and can be said to be a network suitable for a wide range of IoT (Internet of things) services.

IoT terminals require a longer mean time between failures (MTBF) compared to regular terminals. The most effective way to increase MTBF is to lower the power consumption of the power amplifier (PA).

FIG. 1 is an example diagram showing PA linearity according to applied voltage (Vcc).

As shown in FIG. 1, in order to lower the power consumption of the PA, the voltage (hereinafter referred to as "applied voltage or "Vcc") applied to the PA should be lowered. However, when Vcc is lowered, the linearity of the PA deteriorates, and the nonlinearity of the PA causes the performance of the communication system to decrease.

SUMMARY

In view of the above, the present disclosure provides an apparatus and method for adaptively controlling a power amplifier in a low-orbit satellite network.

The present disclosure provides an apparatus and method for efficiently controlling a power amplifier in a low-orbit satellite network using network environment parameters.

The objects to be achieved by the present disclosure are not limited to the objects mentioned above, and other objects not mentioned will be clearly understood by one of ordinary skill in the art from the description below.

According to an aspect of the present disclosure, there is provided a method of controlling a power amplifier in a low-orbit satellite network, the method comprising: communicating, by a terminal, with a satellite; setting an initial applied voltage and frequency; receiving orbit information from the satellite; and updating the initial applied voltage according to the orbit information and network environment.

According to another aspect of the present disclosure, there is provided an apparatus for controlling a power amplifier in a low-orbit satellite network, the apparatus comprising: a memory including instructions; and a processor configured to execute the instructions to thereby communicate, by a terminal, with a satellite, set an initial applied voltage and frequency, receive orbit information from the satellite, and update the initially applied voltage according to the orbit information and network environment.

According to the present disclosure, it is possible to adaptively control the power amplifier in the low-orbit satellite network.

According to the present disclosure, it is possible to efficiently control the power amplifier in the low-orbit satellite network using network environment parameters.

According to the present disclosure, the power consumption of the terminal connected to the low-orbit satellite network can be more efficiently reduced by adaptively applying the applied voltage to the terminal using the environmental parameters of the low-orbit satellite network.

The effects to be obtained by the present disclosure are not limited to the effects mentioned above, and other effects not mentioned will be clearly understood by those skilled in the art from the description below.

DETAILED DESCRIPTION

Figure 1:
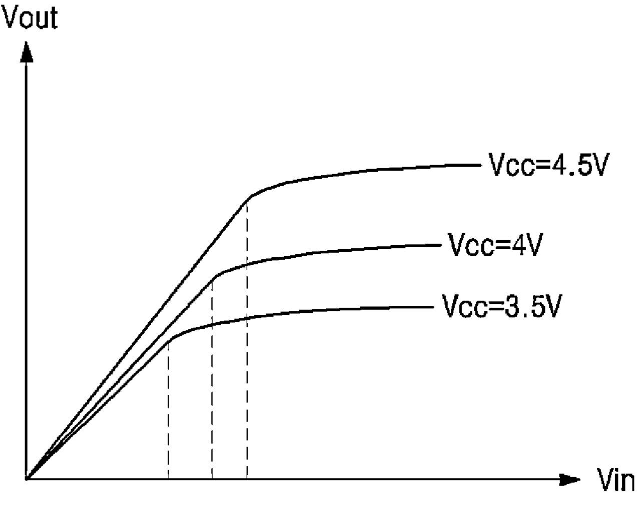
FIG. 1 is an example diagram showing PA linearity according to applied voltage (Vcc).

Hereinafter, some embodiments of the present disclosure will be described in detail using exemplary drawings. It should be noted that in assigning reference numerals to components in each drawing, the same components are given the same reference numerals as much as possible even when they are shown in different drawings. In addition, in describing the present disclosure, if it is determined that a detailed description of a related known configuration or function may obscure the gist of the present disclosure, the detailed description will be omitted.

In describing components of the embodiment according to the present disclosure, designations such as first, second, i), ii), a), b), and the like may be used. These designations are only used to distinguish the component from other components, and the nature, order, or sequence of the component is not limited by the designations. In the present specification, when it is described that a part 'includes or comprises' or 'has' a certain component, this means that it does not exclude other components but may further include other components, unless explicitly stated to the contrary.

The detailed description set forth below in conjunction with the accompanying drawings is intended to describe exemplary embodiments of the present disclosure and is not intended to represent the only embodiments in which the present disclosure may be practiced.

In the present specification, a terminal may be referred to as a terminal, access terminal, mobile terminal, station, subscriber station, mobile station, portable subscriber station, node, device, IoT terminal, etc. Here, as the terminal, a desktop computer, laptop computer, tablet PC, wireless phone, mobile phone, smart phone, smart watch, smart glass, e-book reader, PMP (portable multimedia player), portable game console, navigation device, digital camera, DMB (digital multimedia broadcasting) player, digital voice digital audio recorder, digital audio player, digital picture recorder, digital picture player, digital video recorder, digital video player, etc., which can perform communications, may be used.

If the sensitivity of the received signal is low due to the long distance of the communication channel, a power amplifier (PA) can be controlled by increasing the transmission power by increasing Vcc. Conversely, if the communication channel distance is short, the PA can be controlled by lowering Vcc to lower the transmission power. In addition, digital predistortion (DPD) can be used as a method to reduce nonlinearity while lowering power consumption, but backoff, feedback, feedforward, etc. may be used other than DPD. In embodiments of the present disclosure, it is described that DPD is used as a method to reduce nonlinearity while lowering power consumption.

Figure 2:
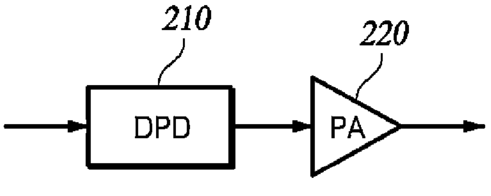
FIG. 2 shows a block diagram of a device for reducing PA power consumption.

FIG. 2 shows a block diagram of a device for reducing PA power consumption.

Referring to FIG. 2, as the device for reducing the power consumption of a PA 220, a DPD 210 is provided at the front stage of the PA 220. As shown in FIG. 2, by providing the device for lowering the power consumption of the PA, the DPD 210 can take on the inverse characteristics of the PA, and the results shown in FIG. 3 can be obtained.

Figure 3:
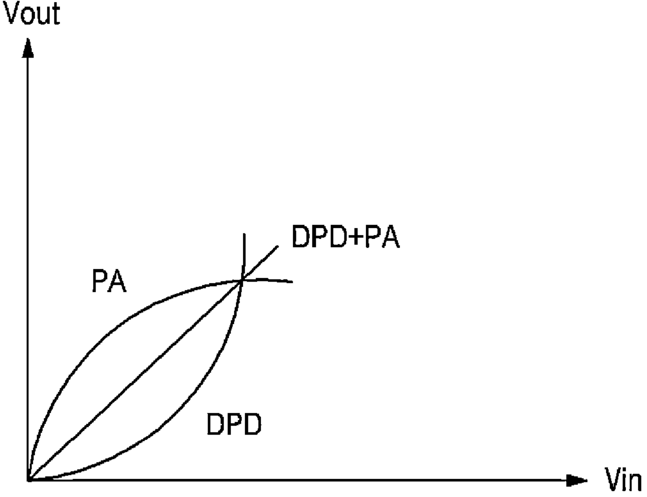
FIG. 3 is an example diagram showing PA and DPD characteristics according to Vcc.

FIG. 3 is an example diagram showing PA and DPD characteristics according to Vcc.

The DPD 210 is intended to compensate for the nonlinearity of the PA 220.

Referring to the line labeled "PA" in FIG. 3, it can be seen that the gain of the PA 220 decreases as the input power increases.

Conversely, referring to the line labeled "DPD" in FIG. 3, it can be seen that the gain of the DPD 210 increases as the input power increases.

Referring to the line labeled "DPD+PA" in FIG. 3, it can be seen that by adding the characteristics of the PA 220 and the characteristics of the DPD 210, the final result can have linear characteristics at the input end of the system.

When the DPD 210 is provided at the front stage of the PA 220, Vcc is lower than when the DPD 210 is not used, thereby lowering power consumption and increasing the performance of the communication system.

In the case of general terrestrial mobile communications, the signal strength in the transmission channel for communications does not change rapidly, so there is no need to drastically change Vcc. However, in the case of a low-orbit satellite network, Vcc needs to be changed rapidly because the distance of the communication channel changes rapidly due to high mobility. Because not only the distance of the communication channel but also the strength of the required transmission signal changes rapidly, Vcc needs to be changed rapidly. The embodiments of the present disclosure propose a power amplifier control method that enables higher power consumption efficiency in a satellite network.

In embodiments of the present disclosure, taking into account the high mobility of satellites in a low-orbit satellite network, a method and apparatus are provided for a terminal communicating using a satellite network to efficiently control a power amplifier using satellite network environment parameters. The satellite network environment parameters according to the embodiments of the present disclosure, which will be described below, include, for example, but are not limited to, a distance between terminals, an inclination angle at which the terminal is facing the satellite, a measured signal to noise ratio (SNR), a target SNR, etc.

In addition, the embodiments of the present disclosure provide a method and apparatus for controlling a power amplifier of a terminal in consideration of an uplink environment in which an IoT terminal transmits in a low-orbit satellite network.

Figure 4:
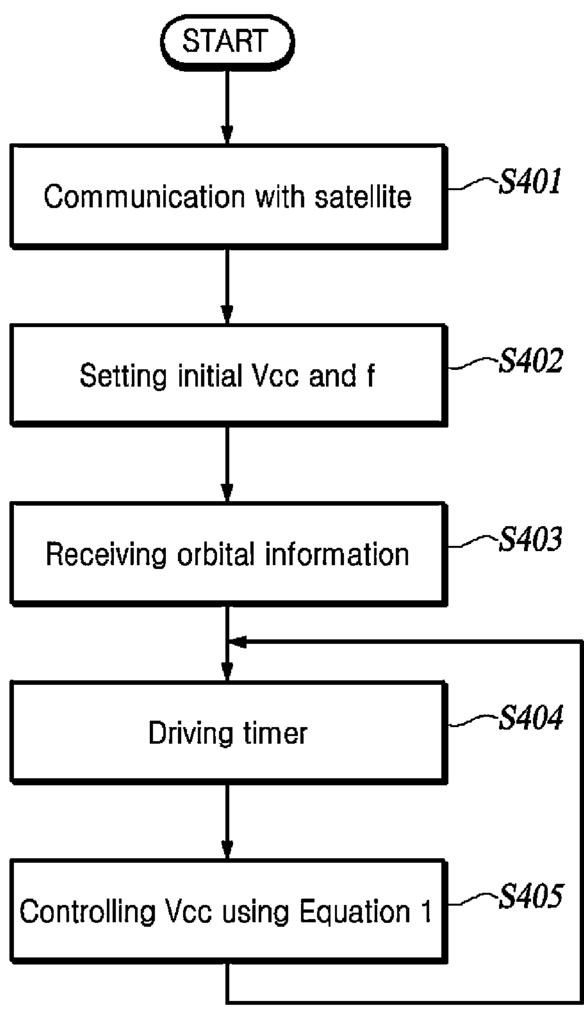
FIG. 4 is a flowchart showing a method of controlling a power amplifier in a low-orbit satellite network according to an embodiment of the present disclosure.

FIG. 4 is a flowchart showing a method of controlling a power amplifier in a low-orbit satellite network according to an embodiment of the present disclosure.

An apparatus for controlling a power amplifier in a low-orbit satellite network communicates with the satellite in step 401. The satellite may refer to a satellite currently communicating with the terminal.

The apparatus for controlling the power amplifier in the low-orbit satellite network sets an initial applied voltage Vcc and a frequency fin step 402. The frequency refers to the frequency for communications.

The apparatus for controlling the power amplifier in the low-orbit satellite network receives orbital information from the satellite in step 403.

The apparatus for controlling the power amplifier in the low-orbit satellite network drives a timer in step 404.

After a predetermined period of time, the apparatus for controlling the power amplifier in the low-orbit satellite network may control Vcc using Equation 1 in step 405.

$$V_{cc}(t, f) = V_{cc}(t_0, f) + L(R_h, \theta_i) \qquad \text{[Equation 1]}$$

where t indicates the point in time when a new applied voltage is applied after updating Vcc, t0 indicates the current time, f indicates the frequency at which communication is currently taking place, L indicates a function based on network parameters, $R_h$ indicates the distance between the currently communicating satellite and the terminal, and $\theta_i$ indicates the inclination angle at which the terminal is facing the satellite.

The Vcc control in step 405 is a control that takes into account the low-orbit satellite network topology (or network environment). The network environment includes a network environment using low-orbit satellites, and more specifically, refers to a network environment in which terminals on the ground can access and use low-orbit satellites.

In low-orbit satellite networks, satellites move along their orbits, so the mobility of satellites has a regular pattern compared to the mobility of users in terrestrial networks. That is, from the terminal's perspective, it is possible to predict the mobility and distance of the satellite currently providing the service.

At the point in time when communication with the terminal is first possible, the satellite transmits orbital information including information on the distance and path to the terminal and the desired communication frequency to the terminal. Based on this, the terminal applies an initial value $V_{cc,init}(f_{init})$ to the power amplifier to communicate with the satellite. At this time, $f_{init}$ is the frequency for communications.

In the case of low-orbit satellite communication, due to very fast mobility and high distance of the communication channel, updating the applied voltage based on the received signal updates Vcc according to the method of Equation 1 above. That is, the applied voltage Vcc is updated by predicting the distance between the satellite and the terminal after t seconds according to the satellite's path (i.e., the applied voltage is set according to the network topology).

Figure 5:
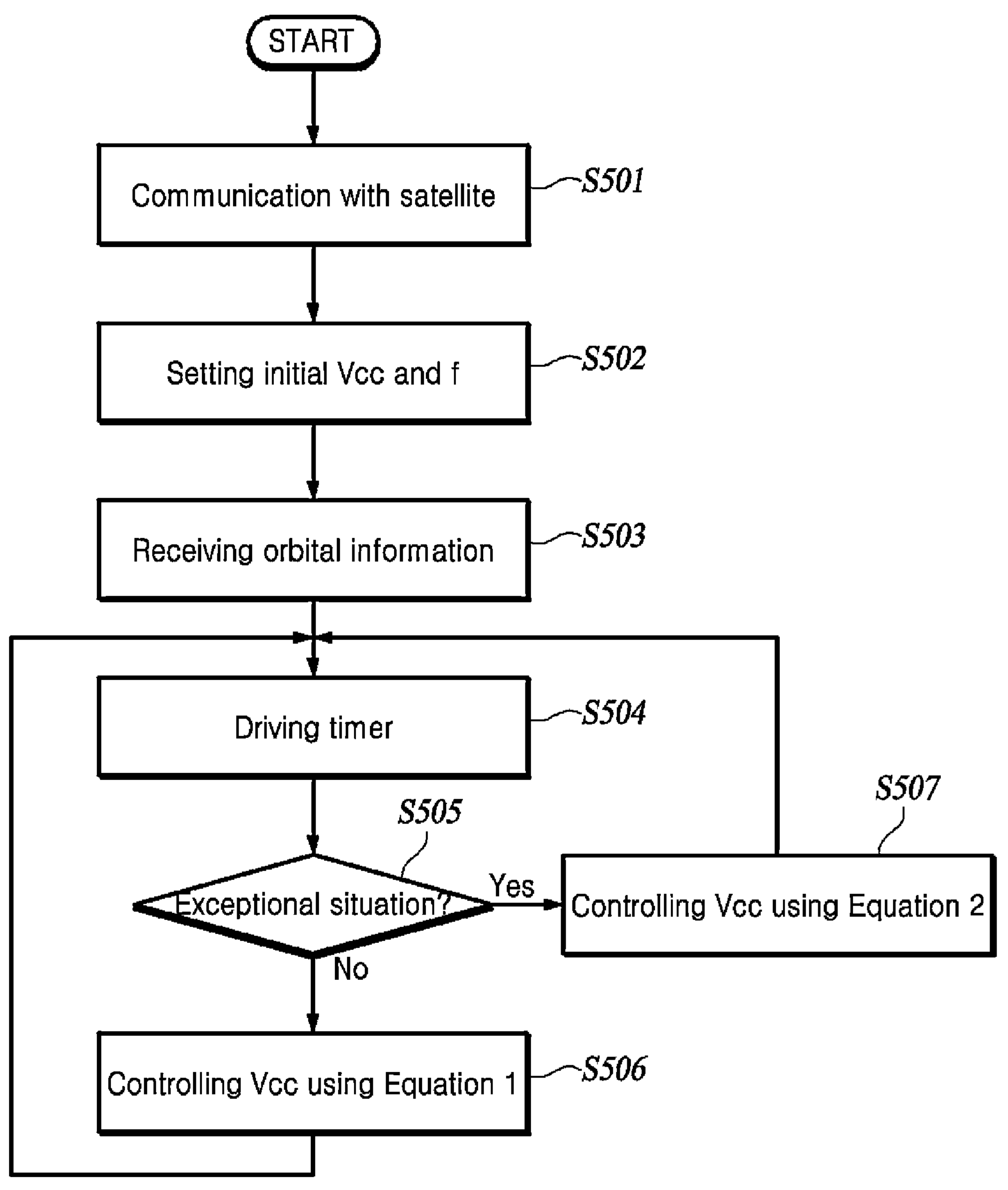
FIG. 5 is a flowchart showing a method of controlling a power amplifier in a low-orbit satellite network according to another embodiment of the present disclosure.

FIG. 5 is a flowchart showing a method of controlling a power amplifier in a low-orbit satellite network according to another embodiment of the present disclosure.

An apparatus for controlling a power amplifier in a low-orbit satellite network communicates with the satellite in step 501. The satellite may refer to a satellite currently communicating with the terminal.

The apparatus for controlling the power amplifier in the low-orbit satellite network sets an initial applied voltage Vcc and a frequency fin step 502. The frequency refers to the frequency for communications.

The apparatus for controlling the power amplifier in the low-orbit satellite network receives orbital information from the satellite in step 503.

The apparatus for controlling the power amplifier in the low-orbit satellite network drives a timer in step 504.

After a predetermined period of time, the apparatus for controlling the power amplifier in the low-orbit satellite network determines whether an exceptional situation has occurred in step 505.

The exceptional situations according to the embodiments of the present disclosure (exceptional situations in FIG. 5 and FIG. 7 to be described later) include, but are not limited to, the following three types.

1. When communication is not smooth due to a large drop in orbit while the satellite is moving.
2. When the beams of a low-orbit satellite are not sufficiently aligned and the SNR changes sharply.
3. When communication is not smooth due to other environmental changes (e.g. heavy rain, large shadowing situations, etc.)

If the signal strength transmitted by the terminal to the satellite is less than a predetermined threshold, it may be determined that an exception situation has occurred due to a sharp change in SNR. On the other hand, if the signal strength transmitted by the terminal to the satellite is greater than or equal to the predetermined threshold, it may be determined that no exceptional situation has occurred.

As a further possible embodiment, the exceptional situation may include a case where sufficient performance is not provided even when a sufficiently high applied voltage is input at the current frequency f0.

If sufficient performance is not provided even when a sufficiently high applied voltage is input at the current frequency f0, communication can be performed in a slightly better hardware environment by changing the current frequency to another frequency (e.g., frequency hopping). For example, if sufficient performance is not provided even when a sufficiently high applied voltage is input at the current frequency f0, the frequency can be changed from f0 to f.

Meanwhile, if no exceptional situation has occurred in step 505, the apparatus for controlling the power amplifier in the low-orbit satellite network may control Vcc using Equation 1 in step 506.

However, if an exceptional situation occurs, the apparatus for controlling the power amplifier in the low-orbit satellite network may control Vcc using Equation 2 in step 507 (instantaneous applied voltage setting). If an exceptional situation occurs and the satellite does not receive sufficient received signals, the satellite may request the terminal to increase the applied voltage Vcc. Then, the terminal may control Vcc using Equation 2 below.

$$V_{cc}(t, f) = V_{cc}(t_0, f) + L(\text{Measured } SNR - \text{Target } SNR) \quad \text{[Equation 2]}$$

where t indicates the point in time when a new applied voltage is applied after Vcc update, t0 indicates the current time, f indicates the frequency at which communication is currently taking place, L indicates a function based on network parameters, and Measured SNR indicates the signal to noise ratio (SNR) received by the satellite from the terminal, and Target SNR indicates the SNR value required for communications.

Figure 6:
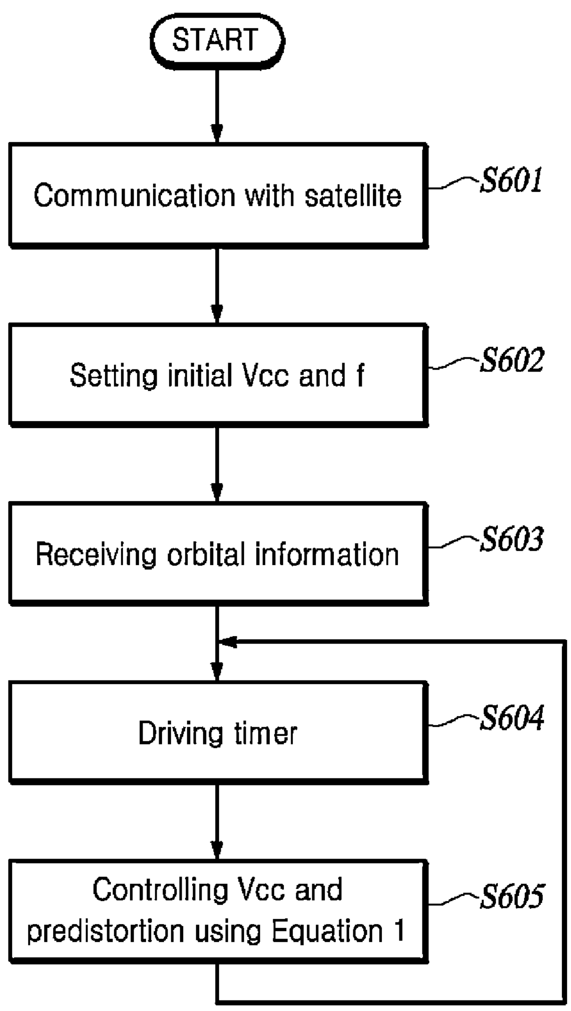
FIG. 6 is a flowchart showing a method of controlling a power amplifier in a low-orbit satellite network according to still another embodiment of the present disclosure.

FIG. 6 is a flowchart showing a method of controlling a power amplifier in a low-orbit satellite network according to still another embodiment of the present disclosure.

An apparatus for controlling a power amplifier in a low-orbit satellite network communicates with the satellite in step 601. The satellite may refer to a satellite currently communicating with the terminal.

The apparatus for controlling the power amplifier in the low-orbit satellite network sets an initial applied voltage Vcc and a frequency f in step 602. The frequency refers to the frequency for communications.

The apparatus for controlling the power amplifier in the low-orbit satellite network receives orbital information from the satellite in step 603.

The apparatus for controlling the power amplifier in the low-orbit satellite network drives a timer in step 604.

After a predetermined period of time, the apparatus for controlling the power amplifier in the low-orbit satellite network may control Vcc and predistortion using Equation 1 above in step 605. The predistortion may be performed by previously storing the inverse characteristics of the PA for each tuple having frequency and applied voltage as elements.

For each tuple having frequency and applied voltage as elements, the inverse characteristics of the PA can be stored in advance, as shown in Equation 3 below.

$$(V_{cc1}, f_1) \to DPD_{11}, \quad (V_{cc1}, f_2) \to DPD_{12}, \cdots (V_{cck}, f_m) \to DPD_{km} \quad \text{[Equation 3]}$$

The reason for storing the inverse characteristics of the PA in advance for predistortion is as follows.

Due to the characteristics of the PA, when a signal is input, the signal is output linearly or non-linearly. The linearly output signal is easily predictable. However, it is difficult to predict the non-linearly output signal.

If the characteristic curve (or inverse characteristic curve) of the PA is made public and can be known in advance by the receiver, when receiving the signal passing through the PA, it is possible to predict how the signal will change non-linearly in response to the corresponding input signal, and thus compensate for the nonlinear output.

The present embodiment can be more efficient in terms of power consumption because the same performance can be expected at a lower Vcc value when predistortion is applied.

Figure 7:
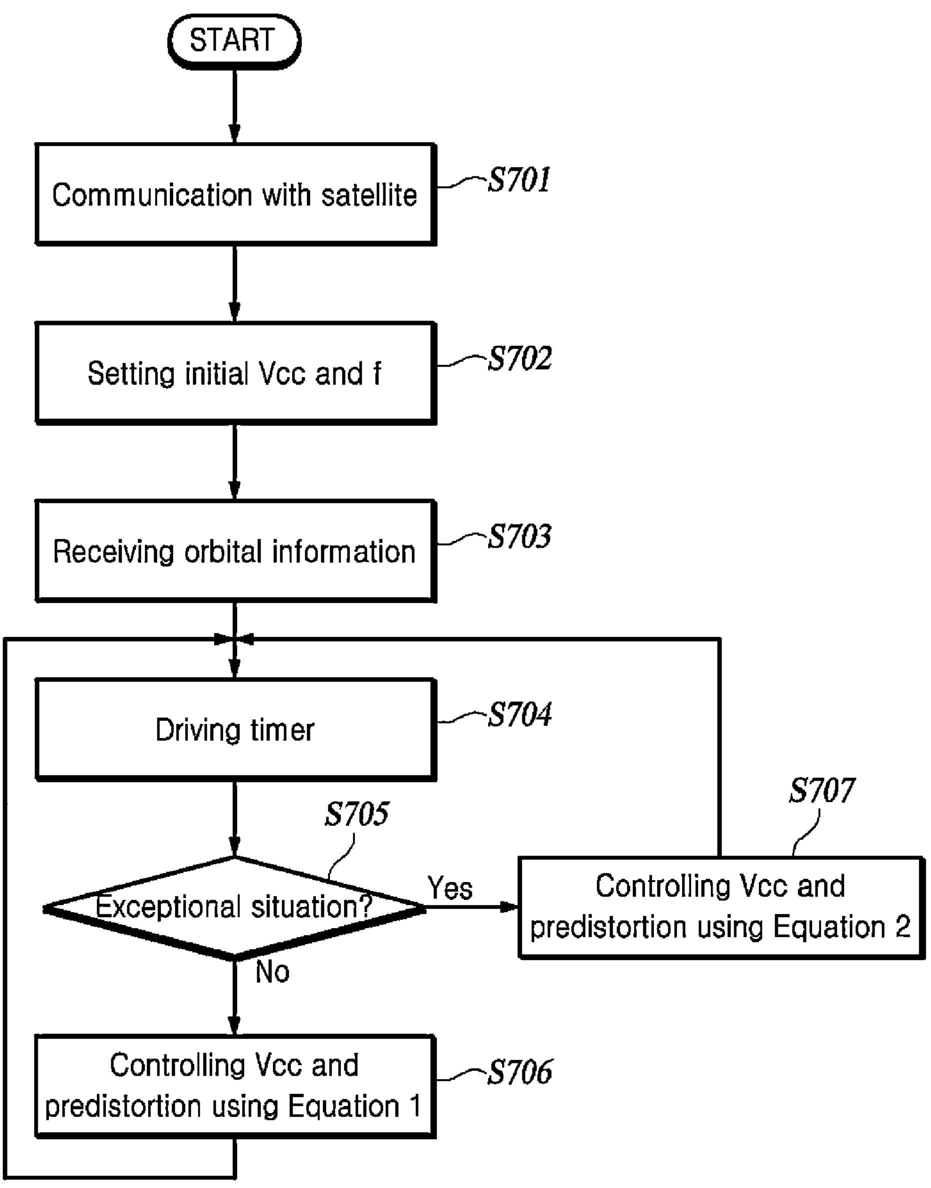
FIG. 7 is a flowchart showing a method of controlling a power amplifier in a low-orbit satellite network according to still another embodiment of the present disclosure.

FIG. 7 is a flowchart showing a method of controlling a power amplifier in a low-orbit satellite network according to still another embodiment of the present disclosure.

An apparatus for controlling a power amplifier in a low-orbit satellite network communicates with the satellite in step 701. The satellite may refer to a satellite currently communicating with the terminal.

The apparatus for controlling the power amplifier in the low-orbit satellite network sets an initial applied voltage Vcc and a frequency fin step 702. The frequency refers to the frequency for communications.

The apparatus for controlling the power amplifier in the low-orbit satellite network receives orbital information from the satellite in step 703.

The apparatus for controlling the power amplifier in the low-orbit satellite network drives a timer in step 704.

After a predetermined period of time, the apparatus for controlling the power amplifier in the low-orbit satellite network determines whether an exceptional situation has occurred in step 705.

If no exceptional situation has occurred, the apparatus for controlling the power amplifier in the low-orbit satellite network can control Vcc and predistortion using Equation 1 above in step 706. The predistortion may be performed by previously storing the inverse characteristics of the PA for each tuple having frequency and applied voltage as elements.

However, when an exceptional situation occurs, the apparatus for controlling the power amplifier in the low-orbit satellite network may control Vcc and predistortion using Equation 2 above in step 707. The predistortion may be performed by previously storing the inverse characteristics of the PA for each tuple having frequency and applied voltage as elements.

The terminal according to the present embodiment can adaptively apply an applied voltage for reliable communication by utilizing network environment parameters of the low-orbit satellite network. Therefore, the present embodiment has the advantage of more efficiently reducing power consumption of a terminal connected to a low-orbit satellite network.

Figure 8:
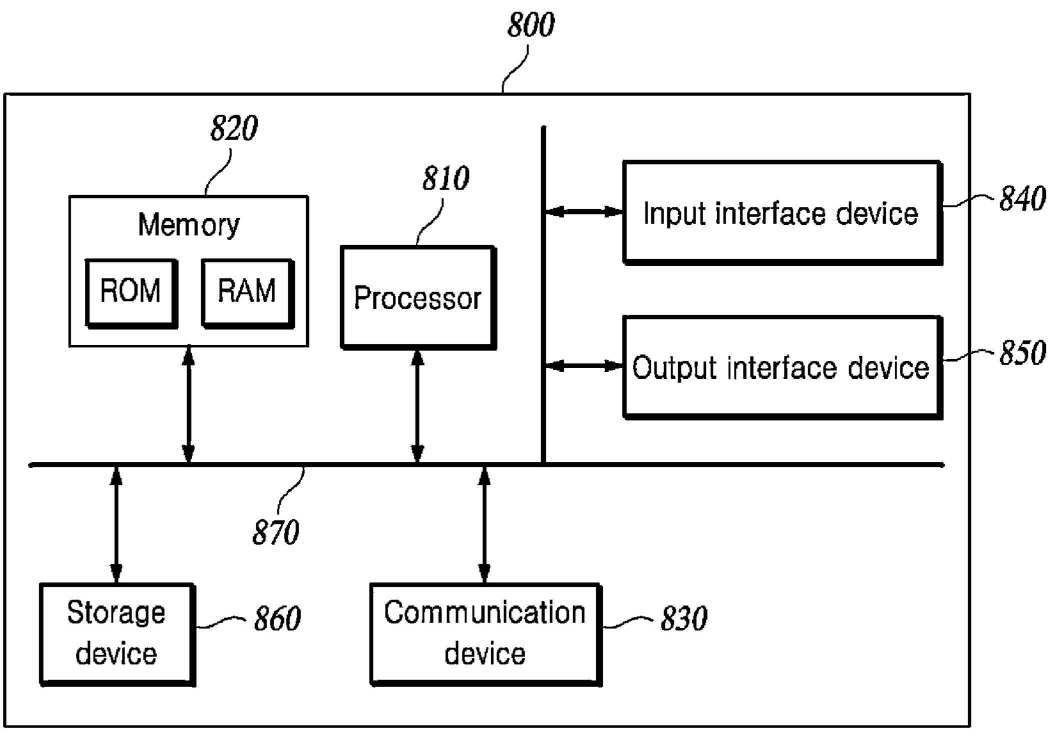
FIG. 8 is a block diagram of an apparatus for controlling a power amplifier in a low-orbit satellite network according to an embodiment of the present disclosure.

FIG. 8 is a block diagram of an apparatus for controlling a power amplifier in a low-orbit satellite network according to an embodiment of the present disclosure.

Referring to FIG. 8, a communication node 800 may include at least one processor 810, a memory 820, and a communication device 830 that is connected to a network and performs communication. In addition, the communication node 800 may further include an input interface device 840, an output interface device 850, a storage device 860, and the like. The components included in the communication node 800 are connected through a bus 870 and can communicate with each other.

However, each component included in the communication node 800 may be connected through an individual interface or individual bus with respect to the processor 810, rather than the common bus 870. For example, the processor 810 may be connected to at least one of the memory 820, the communication device 830, the input interface device 840, the output interface device 850, and the storage device 860 through a dedicated interface . . . .

The processor 810 may execute a program command stored in at least one of the memory 820 and the storage device 860. The processor 810 may be a central processing unit (CPU), a graphics processing unit (GPU), or a dedicated processor on which methods according to embodiments of the present disclosure described in FIGS. 4 to 7 are performed. Each of the memory 820 and the storage device 860 may be comprised of at least one of, for example, a volatile storage medium and a non-volatile storage medium. For example, the memory 820 may be comprised of at least one of read only memory (ROM) and random access memory (RAM).

At least some of the components described in the exemplary embodiments of the present disclosure may be implemented as hardware elements including at least one or a combination of a digital signal processor (DSP), a processor, a network controller, an application-specific IC (ASIC), a programmable logic device (FPGA), and other electronic devices. In addition, at least some of the functions or processes described in the exemplary embodiments may be implemented as software, and the software may be stored in a recording medium. At least some of the components, functions, and processes described in the exemplary embodiments of the present disclosure may be implemented through a combination of hardware and software.

Methods according to the exemplary embodiments of the present disclosure may be written as a program that can be executed on a computer, and may also be implemented in various recording mediums such as a magnetic storage medium, an optical read medium, a digital storage medium, and the like.

Implementations of the various techniques described herein may be realized by digital electronic circuitry, or by computer hardware, firmware, software, or combinations thereof. Implementations may be made as a computer program tangibly embodied in a computer program product, i.e., an information carrier, e.g., machine-readable storage device (computer-readable medium) or a radio signal, for processing by or for controlling the operation of a data processing device, e.g., a programmable processor, a computer, or multiple computers. Computer programs, such as the computer program(s) described above, may be written in any form of programming language, including compiled or interpreted languages, and may be deployed in any form as a stand-alone program or as a module, component, subroutine, or other units suitable for use in a computing environment. The computer program may be deployed to be processed on one computer or multiple computers at one site or distributed across multiple sites and developed and interconnected through a communications network.

Processors suitable for processing computer programs include, for example, both general-purpose and special-purpose microprocessors, and any one or more processors of any type of digital computer. Typically, a processor will receive instructions and data from read-only memory or random access memory, or both. Elements of the computer may include at least one processor that executes instructions and one or more memory devices that store instructions and data. In general, the computer may include one or more mass storage devices that store data, such as magnetic disks, magneto-optical disks, or optical disks, or may be coupled to the mass storage devices to receive data therefrom and/or transmit data thereto. Information carriers suitable for embodying computer program instructions and data include, for example, semiconductor memory devices, magnetic mediums such as hard disks, floppy disks, and magnetic tapes, optical mediums such as CD-ROM (Compact Disk Read Only Memory), and DVD (Digital Video Disk), magneto-optical mediums such as floptical disk, ROM (Read Only Memory), RAM (Random Access Memory), flash memory, EPROM (Erasable Programmable ROM), EEPROM (Electrically Erasable Programmable ROM), and the like. The processor and memory may be supplemented by or included in special purpose logic circuitry.

The processor may execute an operating system and software applications executed on the operating system. In addition, the processor device may access, store, manipulate, process, and generate data in response to the execution of software. For ease of understanding, the processor device may be described as being used as a single processor device, but one of ordinary skill in the art will understand that the processor device may include a plurality of processing elements and/or a plurality of types of processing elements. For example, the processor device may include a plurality of processors or one processor, and one network controller. Further, other processing configurations, such as parallel processors, are also possible.

In addition, a non-transitory computer-readable medium may be any available medium that can be accessed by a computer and may include both a computer storage medium and a transmission medium.

Although the present specification contains details of numerous specific implementations, these should not be construed as limiting the scope of any invention or claimed subject matter, but rather as descriptions of features that may be unique to a specific embodiment of a specific invention. Certain features described herein in the context of individual embodiments may also be implemented in combination in a single embodiment. Conversely, various features described in the context of a single embodiment may also be implemented in multiple embodiments individually or in any suitable sub-combination. Furthermore, although features may be described as operating in a particular combination and initially claimed as such, one or more features from a claimed combination may in some cases be excluded from that combination, and the claimed combination may be changed to a sub-combination or modification of the sub-combination.

Similarly, although the drawings depicts operations in a specific order, this should not be construed as requiring that those operations be performed in the specific order or sequential order shown or that all of the depicted operations be performed to obtain desirable results. In certain cases, multitasking and parallel processing may be advantageous. In addition, the separation of various device components in the above-described embodiments should not be construed as requiring such separation in all embodiments, and it should be understood that the described program components and devices may generally be integrated together into a single software product or packaged in multiple software products.

Meanwhile, the embodiments of the present disclosure described in the present specification and drawings are merely provided as specific examples to aid understanding and are not intended to limit the scope of the present disclosure. It is obvious to those having ordinary skill in the art to which the present disclosure pertains that in addition to the embodiments disclosed herein, other modifications based on the technical idea of the present disclosure can be implemented.

The scope of protection of the present disclosure should be interpreted in accordance with the following claims, and all technical ideas within the equivalent scope should be interpreted as being included in the scope of rights of the present disclosure.

What is claimed is:

1. A method of controlling a power amplifier in a low-orbit satellite network, the method comprising:

communicating, by a terminal, with a currently-communicating satellite;

setting an initial applied voltage and frequency;

receiving orbit information from the satellite; and updating the initial applied voltage according to the orbit information and network environment;

wherein when a signal strength transmitted by the terminal to the currently-communicating satellite is greater than or equal to a predetermined threshold, the initial applied voltage is updated based on information on a distance between the currently-communicating satellite and the terminal and information on an inclination angle at which the terminal is facing the currently-communicating satellite.

2. The method of claim 1, wherein the updating of the initial applied voltage is performed by the following Equation, $$V_{cc}(t, f) = V_{cc}(t_0, f) + L(R_h, \theta_i) \quad \text{[Equation]}$$

where t indicates a point in time when a new applied voltage is applied after updating Vcc, $t_0$ indicates a current time, f indicates a frequency at which communication is currently taking place, L indicates a function based on network parameters, $R_h$ indicates the distance between the currently-communicating satellite and the terminal, and $\theta_i$ indicates the inclination angle at which the terminal is facing the currently-communicating satellite.

3. The method of claim 1, wherein when the signal strength transmitted by the terminal to the currently-communicating satellite is less than the predetermined threshold, the initial applied voltage is updated based on a signal to noise ratio (SNR) received by the satellite from the terminal and a SNR required for communications.

4. The method of claim 3, wherein the updating of the initial applied voltage is performed by the following Equation, $$V_{cc}(t, f) = V_{cc}(t_0, f) + L(\text{Measured } SNR - \text{Target } SNR) \quad \text{[Equation]}$$

where t indicates a point in time when a new applied voltage is applied after Vcc update, $t_0$ indicates a current time, f indicates a frequency at which communication is currently taking place, L indicates a function based on network parameters, and Measured SNR indicates a SNR value received by the currently-communicating satellite from the terminal, and Target SNR indicates a SNR value required for communications.

5. The method of claim 1, wherein digital predistortion is applied.

6. The method of claim 5, wherein the updating of the initial applied voltage is performed by the following Equation, $$V_{cc}(t, f) = V_{cc}(t_0, f) + L(R_h, \theta_i) \quad \text{[Equation]}$$

where t indicates a point in time when a new applied voltage is applied after updating Vcc, $t_0$ indicates a current time, f indicates a frequency at which communication is currently taking place, L indicates a function based on network parameters, $R_h$ indicates the distance between the currently-communicating satellite and the terminal, and $\theta_i$ indicates the inclination angle at which the terminal is facing the satellite.

7. The method of claim 5, wherein the digital predistortion is performed by previously storing inverse characteristics of the power amplifier for each tuple having frequency and applied voltage as elements.

8. The method of claim 1, wherein when the signal strength transmitted by the terminal to the currently-communicating satellite is less than the predetermined threshold, the initial applied voltage is updated based on a signal to noise ratio (SNR) received by the currently-communicating satellite from the terminal and a SNR required for communications, and digital predistortion is applied.

9. The method of claim 8, wherein the updating of the initial applied voltage is performed by the following Equation, $$V_{cc}(t, f) = V_{cc}(t_0, f) + L(\text{Measured } SNR - \text{Target } SNR) \quad \text{[Equation]}$$

where t indicates a point in time when a new applied voltage is applied after Vcc update, $t_0$ indicates a current time, f indicates a frequency at which communication is currently taking place, L indicates a function based on network parameters, and Measured SNR indicates a SNR value received by the currently-communicating satellite from the terminal, and Target SNR indicates a SNR value required for communications, and the digital predistortion is performed by previously storing inverse characteristics of the power amplifier for each tuple having frequency and applied voltage as elements.

10. An apparatus for controlling a power amplifier in a low-orbit satellite network, the apparatus comprising:

a memory including instructions; and a processor configured to execute the instructions to thereby communicate, by a terminal, with a currently-communicating satellite, set an initial applied voltage and frequency, receive orbit information from the currently-communicating satellite, and update the initially applied voltage according to the orbit information and network environment;

wherein when a signal strength transmitted by the terminal to the currently-communicating satellite is greater than or equal to a predetermined threshold, the initial applied voltage is updated based on information on a distance between the currently-communicating satellite and the terminal and information on an inclination angle at which the terminal is facing the currently-communicating satellite.

11. The apparatus of claim 10, wherein the updating of the initial applied voltage is performed by the following Equation, $$V_{cc}(t, f) = V_{cc}(t_0, f) + L(R_h, \theta_i) \quad \text{[Equation]}$$

where t indicates a point in time when a new applied voltage is applied after updating Vcc, $t_0$ indicates a current time, f indicates a frequency at which communication is currently h indicates the distance taking place, L indicates a function based on network parameters, $R_h$ between the currently-communicating satellite and the terminal, and $\theta_i$ indicates the inclination angle at which the terminal is facing the currently-communicating satellite.

12. The apparatus of claim 10, wherein when the signal strength transmitted by the terminal to the currently-communicating satellite is less than the predetermined threshold, the initial applied voltage is updated based on a signal to noise ratio (SNR) received by the currently-communicating satellite from the terminal and a SNR required for communications.

13. The apparatus of claim 12, wherein the updating of the initial applied voltage is performed by the following Equation, $$V_{cc}(t, f) = V_{cc}(t_0, f) + L(\text{Measured } SNR - \text{Target } SNR) \quad \text{[Equation]}$$

where t indicates a point in time when a new applied voltage is applied after Vcc update, $t_0$ indicates a current time, f indicates a frequency at which communication is currently taking place, L indicates a function based on network parameters, and Measured SNR indicates a SNR value received by the currently-communicating satellite from the terminal, and Target SNR indicates a SNR value required for communications.

14. The apparatus of claim 10, wherein digital predistortion is applied.

15. The apparatus of claim 14, wherein the updating of the initial applied voltage is performed by the following Equation, $$V_{cc}(t, f) = V_{cc}(t_0, f) + L(R_h, \theta_i) \quad \text{[Equation]}$$

where t indicates a point in time when a new applied voltage is applied after updating Vcc, $t_0$ indicates a current time, f indicates a frequency at which communication is currently taking place, L indicates a function based on network parameters, $R_h$ indicates the distance between the currently-communicating satellite and the terminal, and $\theta_i$ indicates the inclination angle at which the terminal is facing the satellite.

16. The apparatus of claim 14, wherein the digital predistortion is performed by previously storing inverse characteristics of the power amplifier for each tuple having frequency and applied voltage as elements.

17. The apparatus of claim 10, wherein when the signal strength transmitted by the terminal to the currently-communicating satellite is less than the predetermined threshold, the initial applied voltage is updated based on a signal to noise ratio (SNR) received by the currently-communicating satellite from the terminal and a SNR required for communications, and digital predistortion is applied.

18. The apparatus of claim 17, wherein the updating of the initial applied voltage is performed by the following Equation, $$V_{cc}(t, f) = V_{cc}(t_0, f) + L(\text{Measured } SNR - \text{Target } SNR) \quad \text{[Equation]}$$

where t indicates a point in time when a new applied voltage is applied after Vcc update, $t_0$ indicates a current time, f indicates a frequency at which communication is currently taking place, L indicates a function based on network parameters, and Measured SNR indicates a SNR value received by the currently-communicating satellite from the terminal, and Target SNR indicates a SNR value required for communications, and the digital predistortion is performed by previously storing inverse characteristics of the power amplifier for each tuple having frequency and applied voltage as elements.

* * * * *